Figures 1, 2, 3:
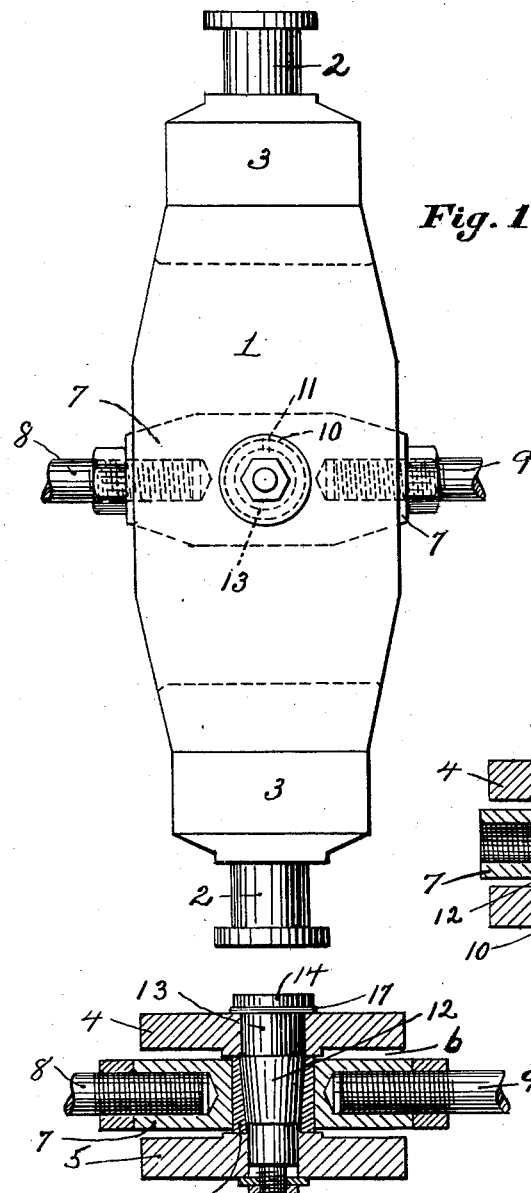

No. 692,288. Patented Feb. 4, 1902.
F. D. HOLDSWORTH.
ENGINE CROSS HEAD.
(Application filed Apr. 9, 1901.)

(No Model.)

Witnesses
H. H. Wimer
Geo. E. Lynch.

Inventor.
Fred D. Holdsworth

UNITED STATES PATENT OFFICE.

FRED DEAN HOLDSWORTH, OF CLAREMONT, NEW HAMPSHIRE, ASSIGNOR TO SULLIVAN MACHINERY COMPANY, OF CLAREMONT, NEW HAMPSHIRE, AND CHICAGO, ILLINOIS, A CORPORATION OF NEW HAMPSHIRE.

ENGINE CROSS-HEAD.

SPECIFICATION forming part of Letters Patent No. 692,288, dated February 4, 1902.

Application filed April 9, 1901. Serial No. 54,980. (No model.)

*To all whom it may concern:*

Be it known that I, FRED DEAN HOLDSWORTH, a resident of Claremont, in the county of Sullivan and State of New Hampshire, have invented a new and useful Improvement in Engine Cross-Heads; and I do hereby declare the following to be a full, clear, and exact description thereof.

My invention relates to engine cross-heads, and more particularly to cross-heads which have wrist-pins at both ends for the attachment of connecting-rods thereto and which cross-heads have a swivel connection with a piston rod or rods in order to relieve the latter from bending strain, due to inequalities in the lengths of the connecting-rods, lack of alinement of the engine-shaft, or to other causes.

The object of my invention is to provide a connection between the piston-rod and cross-head which is so constructed as to permit of taking up the wear of these parts.

In the accompanying drawings, Figure 1 is a plan view of my improved cross-head. Fig. 2 is a transverse section through the center of the same, and Fig. 3 is a similar view of a modification thereof.

In the accompanying drawings, 1 represents the cross-head, which is provided on both ends with wrist-pins 2 for receiving the usual connecting-rods leading to the shaft of the engine, said cross-head being also provided with the guide-faces 3, which move on the ways of the engine-bed in the ordinary manner. The body of the cross-head is cut away centrally to provide the upper wall or plate 4 and lower wall or plate 5, with a space 6 between the same. In this space centrally of the cross-head is located the swivel-block 7, to which swivel-block are attached the piston-rods 8 and 9, said rods being shown as screwed into the swivel-block; but it is obvious that any other suitable means can be used for securing said rods to the block. The block 7 is provided with a central cylindrical hole, in which is located the sleeve or bushing 10, this sleeve or bushing being split, as at 11, and having a conical or tapering bore, as shown, in which fits a tapered portion 12 on the swivel pin or bolt 13, which extends vertically through the cross-head, as shown. This swivel pin or bolt 13 in the modification shown in Fig. 3 is provided with a head 14 on its upper end and with a threaded portion 15 at its lower end, which receives the nut 16. A series of liners or shims 17 are placed between the head of said bolt and the upper plate 4 of the cross-head. As the parts wear one or more of these shims will be removed and the bolt 12 drawn down by means of the nut 16, whereby its tapered portion 12 will expand the split sleeve 10, so that the latter will snugly fit the cylindrical opening in the block 7.

In the preferred form (shown in Fig. 2) the pin or bolt 13 is provided with a screw extension 18 on its upper end, which receives the nut 19, and in order to take up the wear in this construction the nut 19 is loosened and the nut 16 tightened up, thereby drawing said swivel-bolt downward and expanding the split sleeve 10, as will be readily understood.

In the operation of an engine with my improved cross-head if the connecting-rods should be of unequal length or the shaft of the engine out of alinement the cross-head 1 will have a slight rocking or swinging movement about the pin 13 as an axis. This pin, together with the sleeve 10, is secured to the cross-head so that they will rotate or swing in unison with said cross-head, and any wear that takes place will take place between the sleeve 10 and the opening in the block 7. This rotating movement of the cross-head will prevent any bending strain being brought on the piston-rods 8 and 9, as will be readily understood. The sleeve 10 and pin 13 can be made to fit so tightly that they will move in unison with the cross-head, and generally when the nuts 16 and 19 are set up tightly the sleeve 10 is clamped between the upper plate 4 and lower plate 5 of the cross-head, so that said sleeve, together with the bolt 13, swings in unison with the cross-head and the only swivel movement will be between the sleeve 10 and the block 7. If necessary, any suitable means, such as keys or set-screws, may be used to lock the bolt 13 and sleeve 10 to the cross-head. A convenient way of securing this result is by providing the cross-head with a lug, which takes into the slit 11 of the sleeve 10.

It will thus be seen that I have provided a cross-head in which bending strains due to inequalities in the lengths of the connecting-rods or lack of alinement of the engine-shaft cannot be communicated to the piston-rods and that any wear that may occur in the parts can be readily taken up. While I have shown two piston-rods 8 and 9 connected to the block 7, I wish it understood that my invention is not limited thereto, but is equally applicable to a single piston-rod connected to said block.

What I claim as my invention, and desire to secure by Letters Patent, is—

1. An engine cross-head provided with wrist-pins at the ends for the attachment of connecting-rods thereto, of a block provided with a cylindrical opening, a split sleeve fitting in said opening, and a swivel-pin passing through said sleeve and secured to the cross-head to swing therewith, said block being provided with means for the attachment of a piston-rod thereto.

2. An engine cross-head provided with wrist-pins at the ends for the attachment of connecting-rods thereto, of a block provided with a cylindrical opening, a split sleeve therein, said sleeve having a tapered opening, and a swivel-pin having a tapered portion passing through said sleeve and secured to the cross-head to swing therewith.

3. An engine cross-head provided with wrist-pins at the ends for the attachment of connecting-rods thereto, of a block provided with an opening and with means for the attachment of the piston-rod thereto, of a split sleeve in the opening in said block and provided with a tapered opening, and a pin having a tapered portion passing through said sleeve and secured to the cross-head, the construction being such that said pin and sleeve will move in unison with the cross-head.

4. An engine cross-head provided with wrist-pins at the ends for the attachment of connecting-rods thereto, of a block provided with a cylindrical hole through the center thereof and with means for the attachment of the piston-rod thereto, of a split sleeve in said opening, said sleeve having a tapered bore, a swivel-pin having a tapered portion passing through said sleeve, said pin having screw-threaded portions at both ends, and nuts fitting thereon and bearing on the upper and lower faces of the cross-head.

In testimony whereof I, the said FRED DEAN HOLDSWORTH, have hereunto set my hand.

FRED DEAN HOLDSWORTH.

Witnesses:
F. H. FOSTER,
GEO. C. WARNER.